Feb. 3, 1948. P. E. CARY 2,435,493
REFRIGERATION SYSTEM INCLUDING AN INTERNAL-COMBUSTION
ENGINE AND CONTROL MEANS THEREFOR
Filed Nov. 29, 1943
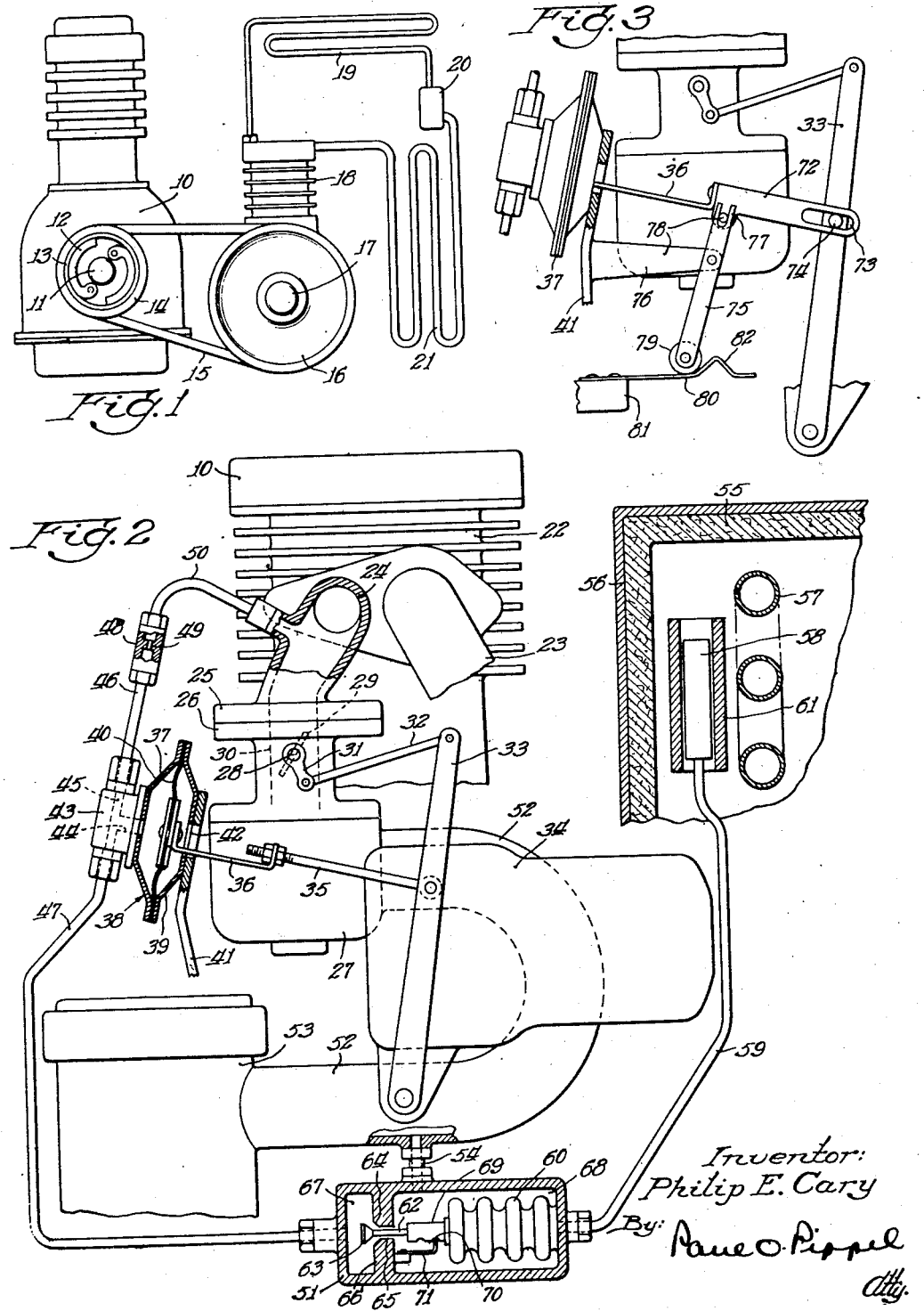
Inventor:
Philip E. Cary Patented Feb. 3, 1948

2,435,493

UNITED STATES PATENT OFFICE 2,435,493

REFRIGERATION SYSTEM INCLUDING AN INTERNAL-COMBUSTION ENGINE AND CONTROL MEANS THEREFOR

Philip E. Cary, Perryville, Md., assignor to International Harvester Company, a corporation of New Jersey Application November 29, 1943, Serial No. 512,085

18 Claims. (Cl. 62—4)

The present invention relates generally to refrigerating apparatus. More particularly, the invention relates to that type of refrigerating apparatus which is designed for use in cooling air in an enclosed space, such as a compartment, a railway car, or a truck body. Apparatus of this type includes a compressor, a condenser, an evaporating coil, and a power plant for driving the compressor. In the present invention, the power plant is an internal-combustion engine, and the invention relates particularly to means for controlling the operation of the engine.

In refrigerating apparatus of the engine-driven type, it is customary to employ a governor for limiting or holding the engine to a fixed or predetermined maximum speed. It has also been customary to employ a thermostat for controlling the operation of the engine so that when the temperature of the space to be cooled rises to a predetermined point, the amount of refrigeration supplied is increased, and when the temperature drops to a predetermined point, the amount of refrigeration supplied is decreased. It has been found that a governor in itself is not satisfactory for this purpose, as a compressor requires substantially the same operating torque at high and low speeds and as an internal-combustion engine does not have sufficient torque at idling speeds to turn over the compressor, it has, therefore, been found necessary to provide means, additional to a governor control, for regulating an engine-driven compressor for refrigerating apparatus.

An object of the invention is to provide in a refrigerating apparatus of the type under consideration, an engine control device operable by the temperature in the space to be refrigerated.

A more specific object is to provide a device for modifying the action of a governor operable along with a centrifugal clutch to regulate the speed and drive of the engine with relation to the amount of refrigeration required.

Another specific object is to provide an engine manifold depression type of control to provide actuating power for the governor control and to modify said control by a temperature actuating element.

Other objects of the invention and various advantages and characteristics of the present control for a refrigerating apparatus will become apparent from a consideration of the following detailed description. The invention consists of several novel features and modifications which are hereinafter set forth.

In the drawings which accompany and form a part of this disclosure:

Figure 1 is a schematic or diagrammatic view of a refrigeration apparatus of a type in which the invention may be embodied;

Figure 2 is a side elevational view of an engine, showing the control mechanism of the invention and diagrammatically a portion of the refrigerated compartment; and Figure 3 shows a modification of a snap action controlling mechanism for the engine.

A conventional refrigerating apparatus is indicated in Figure 1. An air-cooled engine 10 is illustrated in outline as having a crank-shaft 11 on which two centrifugally actuated clutch shoes 12 are pivotally connected for engaging a clutch drum 13. Said clutch drum, which is freely rotatable on the crank-shaft 11, carries a V-groove pulley 14 for driving a V-belt 15. Said belt engages a drive pulley 16 on the crankshaft 17 of a compressor 18. The discharge from said compressor passes through a condenser 19 to an expansion valve 20, which supplies the compressed refrigerant to an expansion coil 21. From said expansion coil, the refrigerating gas is drawn back into the compressor. Figure 1 shows merely a representative gas-engine-driven type of refrigerating apparatus diagrammatically to better illustrate the invention which resides in a controlling mechanism for an internal combustion engine. In Figure 2, which shows a cylinder 22 of the engine 10 in greater detail, an exhaust conduit 23 and an inlet conduit 24 are shown connected to the side of the engine. The inlet conduit 24 is connected by a flange 25 with a flange 26 of a conventional carburetor 27. Said carburetor is provided with a throttle shaft 28 and a throttle 29, which is shown in dotted lines as being positioned in the throat in a mixture passage 30 of a carburetor. An actuating arm 31 on the throttle shaft 28 is connected by an actuating link 32 with a governor control arm 33. Said arm is pivotally mounted on a governor housing 34 and is connected by conventional means, not shown, to the governor mechanism which is in turn connected to the engine to be operated thereby in the usual manner, as by mechanism shown and described, for example, in the United States patent to L. C. Freeman No. 1,162,048 dated November 30, 1915.

The governor arm 33 is also connected intermediate its ends with a link 35, which is adjustably connected to a connecting member 36 secured to a diphragm 37. Said diaphragm forms a part of a control device 38, which includes, in addition to the diaphragm, an inner housing member 39 and an outer housing member 40 which are joined at the edges to secure the diaphragm in position and which are spaced at their inner portions to permit necessary movement of the diaphragm. The housing member 39 is secured to a supporting means 41 for holding the device in position. An aperture 42 in said member permits free passage and movement of the member 36. The outer housing member 40 is secured to a fitting 43, which is formed with a conduit 44 communicating with the interior of the housing member. The fitting 43 further includes a passage or conduit 45 normal to and in communication with the conduit 44. The conduit 45 is open at both ends of the fitting 43 and is connected to a conduit 46 at one end and to a conduit 47 at the other end.

The conduit 46 is connected with a fitting 48 in which a restricted bleed opening 49 is formed. Beyond said bleed opening a conduit 50 connects the fitting with the inlet conduit 24, as shown by the broken away section of said conduit.

The conduit 47 is connected to a housing 51 which contains a control element, as will be hereinafter described. An air inlet conduit 52 connected to the air inlet of the carburetor 27 communicates with an air cleaner 53. A conduit 54 connected to said air inlet, as shown by the broken away section of Figure 2, communicates with the housing 51.

A portion of a refrigerating cabinet or chamber to be cooled is illustrated by an insulated horizontal wall 55 and a vertical wall 56. Expansion coils 57 are illustrated which correspond to the evaporator 21 shown in the diagram of Figure 1. A heat responsive element 58 is illustrated located in the compartment to be refrigerated at a point suitable for obtaining the proper regulation of temperature in said chamber. Said element, which is of the conventional type containing expansible and contractible fluid, is connected by a conduit 59 with a bellows-like element 60 in the housing 51. Said bellows expands with the increase of temperature in the refrigerated chamber and contracts with the lowering of the temperature in said chamber. A relatively thick jacket 61 is shown around the element 58. This jacket may be formed of material having a relatively high specific heat value or a relatively low conducting value, whereby there will be a lag in the transfer of heat to and from the element 58 thereby giving a delayed action in the response of said element to the temperature change in the refrigerated compartment.

The element 60 is connected to a stem 62 on a valve 63, which is positioned to engage a seat 64 surrounding an opening 65 formed in a partition 66 which separates the housing 51 into a compartment 67 and a compartment 68. The conduit 47 communicates with the compartment 67. The conduit 54 communicates with the compartment 68.

The element 60 also carries for movement therewith a member 69 which is provided with a pair of spaced notches 70 engageable by the bent up end of a light leaf spring 71 rigidly secured at one end to the housing 51.

In the operation of the control device above described, assuming the engine is operating at full governor speed, the compressor will also be operating at full capacity with the maximum amount of liquefied refrigerant being supplied to the expansion valve 20 and therefrom into the evaporator 21 and the coils 57. In a device of this type, it is necessary to have an excess refrigerating capacity to take care of extreme conditions of temperature or large stocks of warm materials stored in the refrigerated compartment. When the compartment reaches the desired low temperature, the apparatus will continue to run at full capacity for a short time due to the time lag of the jacket 61 around the control element 58. As said element is cooled, the bellows unit 60 begins to contract, thereby closing the valve 63.

In the operation of the engine at rated load and speed, the governor 34 will regulate the throttle valve to maintain the desired speed of the engine. A depression will exist in the conduit 24 dependent upon the load on the engine, which in a system of this type will be substantially uniform. Air will be drawn through the conduits 50, 46, and 47, the opening 65, and the conduit 54 from the inlet air conduit 52. As this air has already passed through the air cleaner and as the volume is very small, it has no adverse effect on the operation of the engine. The bleed opening 49 in the fitting 48 restricts this air flow to a very small volume and reduces the possible lowering of pressure in the compartment 68 of the housing 51 so as to not influence the action of the bellows unit 60. The same control prevents a reduction in pressure sufficient to affect the diaphragm 37 in the pressure-responsive device 38.

As the valve 63 is closed in the manner above described by a reduction in the temperature of the refrigerated chamber, the restriction caused by said valve approaching its seat 64 is greater than the restriction of the bleed opening 49. A pressure reduction then takes place in the connecting conduits, thereby simultaneously lowering pressure in the chamber formed between the diaphragm 37 and the housing cover 40. The diaphragm and the elements carried thereby including the link 35 then move to the left, as shown in Figure 2, modifying the governor action by closing the throttle 29 in the throat of the carburetor. This action slows down the engine and reduces the speed of the compressor thereby reducing the amount of refrigeration supplied to the evaporator. As the contraction of the unit 60 continues, the valve 63 is completely closed. Pressure adjacent the diaphragm 37 is then reduced to the pressure in the inlet manifold 24. This provides sufficient force to overcome the governor action and completely close the throttle valve 29 to idle operation of the engine.

As the engine drops to idle position, the centrifugal clutch shoes 12 disengage, stopping the supply of power to the compressor which remains inoperative so long as the engine is idling.

When the temperature of the refrigerated compartment rises, an action substantially reverse to that above described takes place. The valve 63 is opened, permitting the flow of air through the conduit 54, the opening 65, the conduit 47, and the conduit 46. The bleed opening 49 then forms a regulating orifice, because of which the pressure in the conduits up to that point becomes substantially atmospheric. The diaphragm 37 then moves to the right under the action of the governor with little effect on the governor action. The throttle is opened by the governor, the engine picks up speed, the clutch shoes 12 throw out by centrifugal force engaging the clutch drum 13, and the compressor is put into operation until the control action described is repeated.

The member 69 carried by the bellows unit 60 and the spring 71, constitute a means for holding the valve 63 against movement until sufficient temperature change has taken place in the refrigerated chamber to provide a relatively rapid closing of the valve. The notches 70, which are engaged by the bent up end of the spring 71, give a certain restraining force to hold the valve until a substantial endwise force is available. The same action takes place in the reverse direction. This control is optional but may be used to provide a better actuation of the centrifugal clutch without substantial wear by providing a relatively rapid change in engine speed.

Figure 3 shows a modification in which corresponding parts bear the same numerals. In this construction the member 36, which is connected to the diaphragm 37, is joined to the governor arm 33 by a member 72 which is slotted at 73 to slide over a connecting pin 74 mounted on the governor arm. A link 75 pivoted on a bracket 76 secured to the bracket 41, is provided with a slotted upper end 77 which engages a pin 78 on the member 72. The other end of the link 75 carries a small roller 79 which operates on a leaf spring 80 secured to a supporting bracket 81. Said spring is provided with a hump 82 engageable by the roller 79 as the diaphragm 37 moves in either direction to open or close the throttle of the carburetor. It will be understood that this hump or cam portion of the spring 80 may be shaped to provide the desired modifying control of the governor by the diaphragm 37. In some installations, it is desirable to slow down the operation of the engine but to continue driving the compressor at a reduced speed to maintain a lower rate of supplying refrigeration. In this case, the cam 82 would be spaced from the normal full-load operating position of the roller 79. Whenever sufficient force is available on the diaphragm 37 due to depression in the mixture inlet conduit from the carburetor, the roller 79 rides over the cam portion 82, after which the spring action assists in further closing the throttle. It is not desired that this invention be limited to the exact details of construction shown and described, for obvious modifications will occur to those skilled in the art.

What is claimed is:

1. Control means for a refrigeration apparatus including a compressor, a cooling chamber, an evaporator in the cooling chamber, an internal combustion engine and drive means for connecting the engine to the compressor including an automatic centrifugal clutch operable to engage the drive mechanism when the engine attains a predetermined speed, said engine having a carburetor and a throttle valve therefor, a mixture intake conduit and a speed controlling governor connected to said throttle valve, comprising: a fluid-pressure-responsive device connected to the governor and communicating with the intake conduit and operable upon the application of intake conduit pressure thereto to overcome the governor and close the throttle valve, a temperature-responsive device positioned in the cooling chamber, and means operable by said temperature-responsive device to control the application of pressure in the intake conduit to the pressure-responsive device.

2. Control means for a refrigeration apparatus including a compressor, a cooling chamber, an evaporator in the cooling chamber, an internal combustion engine and drive means for connecting the engine to the compressor including an automatic centrifugal clutch operable to engage and disengage the drive mechanism at predetermined speeds of the engine, said engine having a carburetor, a mixture intake conduit and a speed controlling governor, comprising: a fluid-pressure-responsive device connected to the governor and communicating with the intake conduit, a temperature-responsive device positioned in the cooling chamber, and means operable upon actuation by said temperature-responsive device to regulate the application of pressure in the intake conduit to the pressure-responsive device.

3. A control means for a refrigeration apparatus including a cooling chamber, an evaporator in the cooling chamber, a compressor, an internal combustion engine and drive connections between the engine and the compressor including an automatically operable centrifugal clutch, said engine having a carburetor and mixture intake conduit and a speed controlling governor, comprising: a fluid-pressure-responsive device connected to the governor, a fluid conduit communicating with the intake conduit and with said device, a second fluid conduit in communication with the pressure-responsive device at one end and open to substantial atmospheric pressure at the other end, flow control means in said second conduit, a temperature-responsive device positioned in the cooling chamber, actuating means operatively connecting said temperature-responsive device to said flow control means for regulating the action on the pressure-responsive device by the pressure in the intake manifold, and resilient detent means engageable with said actuating means to delay the operation thereof until a predetermined force is available whereby a faster action is obtained by the pressure-responsive device and whereby a more rapid change is accomplished in the governor action with a subsequent faster operation of the centrifugal clutch.

4. A control means for a refrigeration apparatus including a compressor, a cooling chamber, an evaporator in the cooling chamber and a gas engine drive for the compressor, said engine having a carburetor and mixture intake conduit and a speed-controlling means, comprising a fluid-pressure-responsive device connected to said speed-controlling means and communicating with the intake conduit, a temperature-responsive device positioned in the cooling chamber, and means operable upon actuation by said temperature-responsive device to regulate the application of pressure in the intake conduit to the pressure-responsive device.

5. A control means for a refrigeration apparatus including a compressor, a cooling chamber, an evaporator in the cooling chamber and a gas engine drive for the compressor, said engine having a carburetor and mixture intake conduit and a speed-controlling means, comprising a fluid-pressure-responsive device connected to said speed-controlling means and a fluid-pressure-transmitting conduit communicating with said device and with the intake conduit, flow-restricting means in said fluid-pressure-transmitting conduit, a temperature-responsive device positioned in the cooling chamber, and means operable upon actuation by said temperature-responsive device to regulate the flow of pressure through said flow-restricting means and to thereby regulate the application of pressure in the fluid-pressure-transmitting conduit to the pressure-responsive device.

6. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid-pressure-responsive device connected to the governor and communicating with the intake conduit, a temperature-responsive device positioned in the cooling chamber, and means operable upon actuation by said temperature-responsive device to regulate the application of pressure in the intake conduit to the pressure-responsive device.

7. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid-pressure-responsive device connected to the governor and a fluid-pressure-transmitting conduit communicating with said device and with the intake conduit, a valve in said fluid-pressure-transmitting conduit, a temperature-responsive device positioned in the cooling chamber, and means operable upon actuation by said temperature-responsive device to regulate the position of said valve and to thereby regulate the application of pressure in the intake conduit to the pressure-responsive device.

8. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid-pressure-responsive device connected to the governor and communicating with the mixture intake conduit, a conduit in communication with the pressure-responsive device and open to substantially atmospheric pressure, flow control means for said conduit, a temperature-responsive device positioned in the cooling chamber, and means operatively connecting said temperature-responsive device to said flow-control means for regulating the action on the pressure-responsive device by the pressure in the intake conduit.

9. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid-pressure-responsive device connected to the governor and communicating with the mixture intake conduit, a fluid conduit in communication with the pressure-responsive device and open to substantially atmospheric pressure, flow-control means for said fluid conduit, a temperature-responsive device positioned in the cooling chamber, actuating means operatively associating said temperature-responsive device with said flow-control means for regulating the action on the pressure-responsive device by the pressure in the intake conduit, and resilient means to delay the operation of the fluid-pressure-responsive device until a predetermined force is available.

10. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid-pressure responsive device connected to the governor and communicating with the mixture intake conduit, a conduit in communication with the pressure-responsive device and open to substantially atmospheric pressure, a control valve in said last named conduit, and a temperature-responsive device positioned in the cooling chamber and connected to said valve for regulating the action on the pressure-responsive device by the pressure in the intake conduit.

11. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid-pressure-responsive device connected to the governor, a fluid-pressure-conducting conduit connecting said device with the mixture intake conduit, said fluid-pressure-conducting conduit being provided with a metered orifice for restricting air flow therethrough, a fluid conduit in communication with the pressure-responsive device and open to substantially atmospheric pressure, a control valve in said last named conduit, and a temperature-responsive device positioned in the cooling chamber and operatively connected to said valve for regulating the action on the pressure-responsive device by the pressure in the intake conduit.

12. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid conduit communicating at one end with the mixture intake conduit and being open to substantially atmospheric pressure at its other end, a fluid-pressure-responsive device communicating with said fluid conduit and connected with the governor for modifying the action thereof, a metering orifice in said fluid conduit between the mixture intake conduit and said device, a control valve in said fluid conduit, and a temperature-responsive device positioned in the cooling chamber, said temperature-responsive device being operatively connected to said valve for regulating the action on the governor by the pressure-responsive device.

13. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid conduit communicating at one end with the mixture intake conduit and being open to substantially atmospheric pressure at its other end, a metering orifice in said fluid conduit, a fluid-pressure-responsive device communicating with said fluid conduit and connected with the governor for modifying the action thereof, a control valve in said fluid conduit, resilient means in engagement with said valve for holding the same in one position until a predetermined force is applied thereto, and a temperature-responsive device positioned in the cooling chamber and operatively connected to said valve for closing and opening movement thereof for regulating the modifying action on the governor by the pressure-responsive device.

14. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid conduit communicating at one end with the mixture intake conduit and being open to substantially atmospheric pressure at its other end, a metering orifice in said fluid conduit, a fluid-pressure-responsive device communicating with said fluid conduit and having connections with the governor for modifying the action thereof, resilient means to hold the device against movement until a predetermined force is available thereby delaying modifying action in the governor, a control valve in said fluid conduit, and a temperature-responsive device positioned in the cooling chamber, said temperature-responsive device being operatively connected to said valve for regulating the action on the governor by the pressure-responsive device.

15. For a refrigeration apparatus including a compressor, a cooling chamber, an evaporator in the cooling chamber and a gas engine drive for the compressor, said engine having a carburetor and mixture intake conduit and a speed-controlling governor, a control means comprising a fluid conduit communicating at one end with the mixture intake conduit and being open to substantially atmospheric pressure at its other end, a metering orifice in said fluid conduit, a fluid-pressure-responsive device communicating with said fluid conduit and connected with the governor for modifying the action thereof, a control valve in said fluid conduit, and a temperature-responsive device including a heat-responsive element located in the cooling compartment, an actuating element connected to the valve and an interconnecting communicating conduit for transmitting actuating force from the heat-responsive element to the actuating element, said heat-responsive element being provided with a heat-shielding enclosure to obtain a time delay between the change in temperature of the compartment and the actuation of the valve.

16. For a refrigeration unit including a compressor, a cooling chamber, an evaporator in the cooling chamber and a gas engine drive for the compressor, said engine having a carburetor, an air cleaner, an air intake conduit leading from the carburetor to the air cleaner, a mixture intake conduit and a speed-controlling governor, a control means comprising a temperature-responsive device positioned in the cooling chamber, a fluid-pressure-responsive device connected to the governor for modifying the action thereof, a fluid conduit in communication with the mixture intake conduit and with the air intake conduit, said fluid conduit including a metering orifice to limit the flow of air therethrough, a second fluid conduit connecting the pressure-responsive device to the first mentioned fluid conduit, and means operable to regulate the flow of air through said first named fluid conduit to control the modifying action on the governor by the pressure-responsive device.

17. For a refrigeration unit including a compressor, a cooling chamber, an evaporator in the cooling chamber and a gas engine drive for the compressor, said engine having a carburetor, an air cleaner, an air intake conduit between the carburetor and the air cleaner, an intake manifold and a speed-controlling governor, a control means comprising a temperature responsive device positioned in the cooling chamber, a pressure-responsive device connected to the governor for modifying the action thereof, a conduit connected at one end to the intake manifold and at its other end to the air intake conduit at a location between the carburetor and the air cleaner, said conduit including a metering orifice to limit the flow of air therethrough, a conduit connecting the pressure-responsive device to the first mentioned conduit, and means operable to regulate by the temperature-responsive device the flow of air through said first named conduit to control action on the governor by the pressure-responsive device, said means including a valve and a resilient detent means to hold the valve against movement until a predetermined force is applied thereto.

18. For a refrigeration unit including a compressor, a cooling chamber, an evaporator in the cooling chamber and a gas engine drive for the compressor, said engine having a carburetor, an air cleaner, an air intake conduit connecting the carburetor and air cleaner, a mixture intake conduit and a speed-controlling governor, a control means comprising a temperature-responsive device positioned in the cooling chamber, a fluid-pressure-responsive device connected to the governor for modifying the action thereof, a fluid conduit connected at one end to the mixture intake conduit and at its other end to the air intake conduit at a location between the carburetor and the air cleaner, said fluid conduit including a metering orifice to limit the flow of air therethrough, a second fluid conduit connecting the pressure-responsive device to the first mentioned fluid conduit at a location in said first conduit between the orifice therein and the air intake end thereof, and means operable by the temperature-responsive device to regulate the flow of air through said first named fluid conduit to control the modifying action on the governor by the pressure-responsive device.

PHILIP E. CARY.

REFERENCES CITED

The following references are of record in the file of this patent:

UNITED STATES PATENTS

| Number | Name | Date |
| --- | --- | --- |
| 2,009,659 | Hill et al. | July 30, 1935 |
| 1,162,048 | Freeman | Nov. 30, 1915 |